(12) United States Patent
Bourgeois et al.

(10) Patent No.: US 7,917,339 B2
(45) Date of Patent: Mar. 29, 2011

(54) HEAT TRACE SYSTEM DESIGN

(75) Inventors: Neil Bourgeois, Edmonton (CA); Elson Castillo, Edmonton (CA); Xiaorong Deng, Edmonton (CA); Michael H. Easley, Katy, TX (US); Rodney E. Gilmour, Spruce Grove (CA); Donald Lee Hunter, Pasadena, TX (US); Steven Noel, Edmonton (CA); Brent Steven Podruzny, Edmonton (CA); Mitchell A. Todd, Tigard, OR (US); Willem Philip Westerhuijs, Vijfhuizen (NL)

(73) Assignee: Tyco Thermal Controls LLC, Menlo Park, CA (US)

( * ) Notice: Subject to any disclaimer, the term of this patent is extended or adjusted under 35 U.S.C. 154(b) by 487 days.

(21) Appl. No.: 11/983,056

(22) Filed: Nov. 5, 2007

(65) Prior Publication Data

US 2009/0119073 A1    May 7, 2009

(51) Int. Cl.
    *G06F 17/50* (2006.01)
(52) U.S. Cl. .......................................................... 703/1
(58) Field of Classification Search ....................... 703/1
    See application file for complete search history.

(56) References Cited

U.S. PATENT DOCUMENTS

| 5,740,341 | A  | * | 4/1998 | Oota et al. ................ 345/420 |
| 6,681,140 | B1 | * | 1/2004 | Heil ............................... 700/95 |
| 2003/0074164 | A1 | * | 4/2003 | Simmons et al. ............. 703/1 |

OTHER PUBLICATIONS

Liindsay et al. "Automating Trace Heating Designs from Plant 3-D Models" Jun. 15, 2007, pp. 1-6.
Smith et al. "From Front-End to Final Testing: Detailed Heat Tracking From Plant 3-D Models" Sep. 19, 2007.
VisiTrace™ 3D Design System "Automating Heat Tracing Design from 3D Plant Models" Thermon Manufacturing Co. Feb. 2007.

* cited by examiner

*Primary Examiner* — David Silver (57) ABSTRACT

Heat trace system design is disclosed. In some embodiments, pipe system data including data associated with pipe system components is received, and in response to receiving a selection of a pipe system component, data associated with a set of one or more pipe system components including the selected pipe system component is automatically extracted from the received pipe system data. One or more heat trace system components for the set of pipe system components are determined based at least in part on the extracted data.

25 Claims, 8 Drawing Sheets

HEAT TRACE SYSTEM DESIGN

BACKGROUND OF THE INVENTION

Heat trace systems are employed to heat and maintain pipes and/or materials carried by pipes at desired temperatures or within desired temperature ranges. Applications for automated heat trace system design exist. Typically, such applications require that pipe system data be manually extracted from pipe system design files and entered into the application. Such manual extraction is error-prone and time-consuming. Moreover, in typical applications, the consistency of data used for calculating heat loss and selecting heat trace system components, generating isometric drawings of the heat trace system, and populating the border information on the drawings can not be easily validated. Thus, improvements in heat trace system design are needed.

BRIEF DESCRIPTION OF THE DRAWINGS

Various embodiments of the invention are disclosed in the following detailed description and the accompanying drawings.

DETAILED DESCRIPTION

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright whatsoever.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Heat trace system design is disclosed. In some embodiments, pipe system data including data associated with pipe system components is received, and in response to receiving a selection of a pipe system component, data associated with a set of one or more pipe system components including the selected pipe system component is automatically extracted from the received pipe system data. One or more heat trace system components for the set of pipe system components are determined based at least in part on the extracted data.

As used herein, a pipe system component refers to any appropriate component of a pipe system. Examples of pipe system components include pipes, flanges, valves, supports, instruments, etc. In some embodiments, a pipe system is modularly designed by assembling together individually constructible modules. Such a module is referred to herein as a work breakdown structure (WBS) element. As used herein, a heat trace system component refers to any appropriate component of a heat trace system. Examples of heat trace system components include heating elements or cables, power connection boxes, splice boxes, tee boxes, end seals, attachment devices to attach heat trace system components to corresponding pipe system components, thermostats, controllers, etc. As used herein, a user of a heat trace design system may comprise a person, process, or application.

In some embodiments, the heat trace system of a pipe system may comprise one or more heat trace circuits. Each heat trace circuit is associated with a portion of the pipe system. In some embodiments, the specification of a heat trace circuit (i.e. the specification of the portions of a pipe system to be traced by the heat trace circuit) comprises the specification of one or more pipe segments. As used herein, a pipe segment refers to a (e.g., software) container that includes data associated with a set of one or more contiguous pipe system components that share one or more heat loss properties and/or heater selection criteria. A pipe segment is populated with data needed for heat trace system design. Examples of such data include pipe length, bore, and material; insulation type and thickness; the numbers and/or types of heat sinks (e.g., flanges, valves, supports, instruments); design temperatures; etc. Pipe segments may be hierarchically arranged and/or defined, for example, for each heat trace circuit. A pipe segment hierarchy indicates how various components are logically connected and may include a parent pipe segment and one or more child pipe segments.

Figure 1:
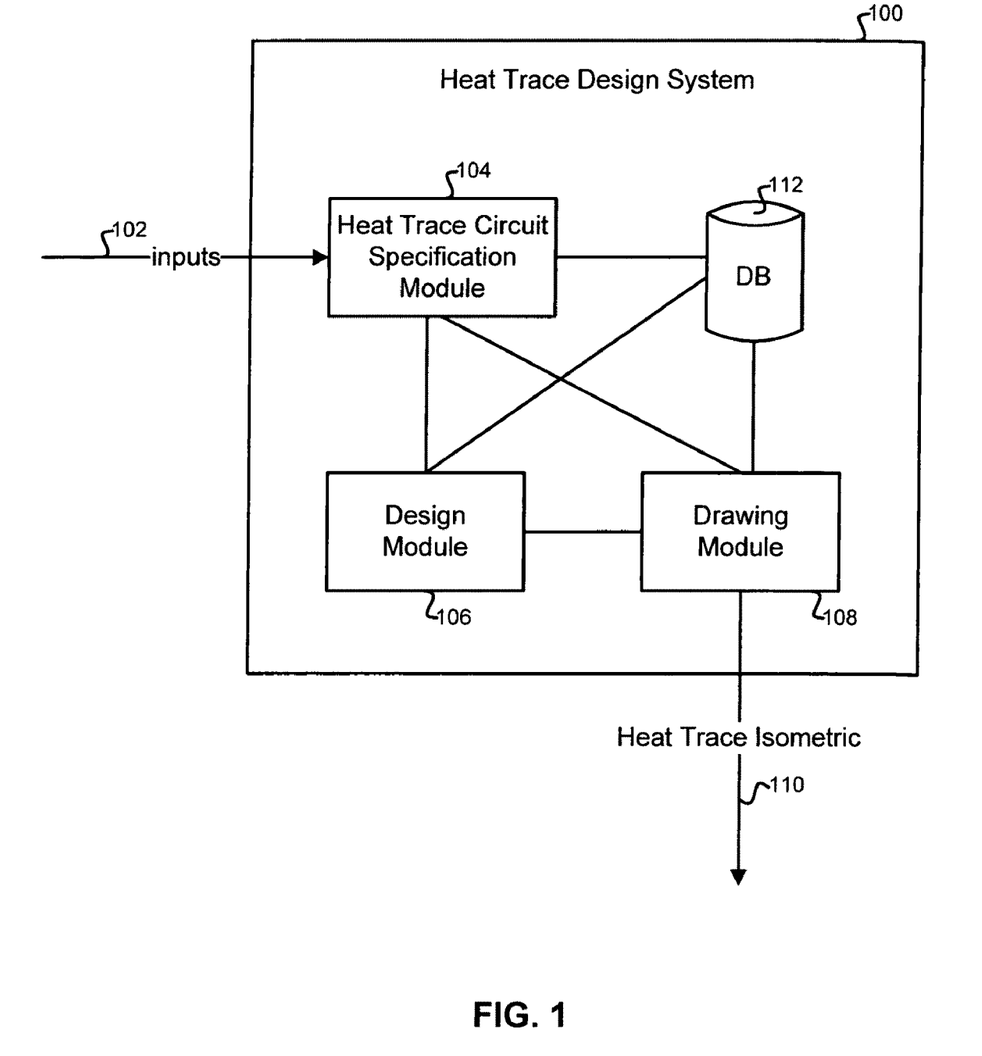
FIG. 1 is a diagram illustrating an embodiment of a heat trace design system.

FIG. 1 is a diagram illustrating an embodiment of a heat trace design system 100. Heat trace design system 100 receives one or more inputs 102 including, for example, data associated with a pipe system that is at least in part desired to be heat traced, configuration information and/or parameters, selections and/or specifications of portions of the pipe system that are desired to be heat traced, etc. Heat trace circuit specification module 104 of heat trace design system 100 receives specifications of heat trace circuits of the pipe system. In some embodiments, the specification of a heat trace circuit comprises the specifications of one or more associated pipe segments. In some embodiments, as described in detail below, in response to receiving a selection of a pipe system component, data associated with pipe system components in the vicinity of the selected pipe system component that share one or more heat loss characteristics and/or heater selection criteria is automatically extracted from available pipe system data and used to populate an associated pipe segment, at least in part eliminating the need for manual extraction and/or input of such data. Heat trace circuit specification module 104 may be employed to define and/or at least in part automatically populate one or more pipe segments comprising the heat trace circuits of a heat trace system of the pipe system. A heat trace circuit or part thereof defined using heat trace circuit specification module 104 may be processed by design module 106. Design module 106 performs heat loss calculations and selects appropriate heat trace system components for the heat trace circuit. Design module 106, for example, may comprise Tyco Thermal Controls' TraceCalc Pro® or another similar automated heat tracing design application. Heat trace circuit routings defined using heat trace circuit specification module 104 and/or calculations and/or heat trace system component selections by design module 106 are employed by drawing module 108 to automatically generate a drawing 110 of at least a portion of the heat trace system. In the given example, the output of heat trace design system 100 comprises one or more heat trace isometric drawings 110. Drawing module 108, for example, may comprise ISOGEN® or another similar automated isometric drawing generating application. Information related to each heat trace circuit designed using heat trace design system 100 is, in some embodiments, stored in a common database 112 or other storage location accessible to each module 104, 106, and 108 so that each module 104, 106, and 108 operates on the same set or instance of pipe and heat trace design data, eliminating or at least reducing the risk of error.

Figure 2:
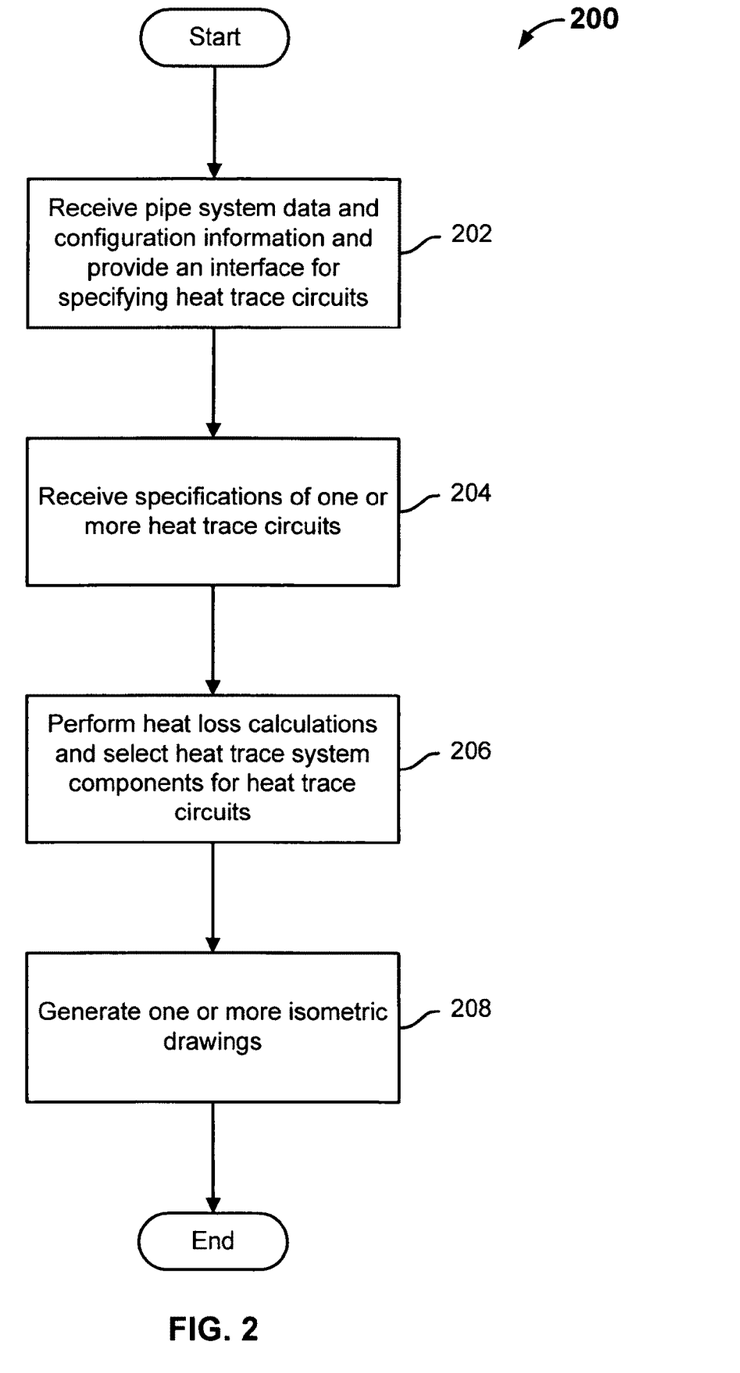
FIG. 2 illustrates an embodiment of a process for designing a heat trace system or part thereof.

FIG. 2 illustrates an embodiment of a process for designing a heat trace system or part thereof. In some embodiments, process 200 is employed by heat trace design system 100 of FIG. 1. Process 200 starts at 202 at which pipe system data and configuration information are received and an interface for specifying heat trace circuits (e.g., associated pipe segments) is provided. At 204, specifications of one or more heat trace circuits are received, for example, via the interface provided at 202. In some embodiments, a specification of a heat trace circuit specification comprises specifications of one or more pipe segments that comprise the heat trace circuit. The pipe segments associated with each heat trace circuit may be hierarchically arranged and/or defined. At 206, heat loss calculations are performed and heat trace system components are selected for the heat trace circuits of 204. At 208, one or more (isometric) drawings of the heat trace system or parts thereof are generated, for example, based at least in part on the specifications of 204 and/or the calculations and/or heat trace system component selections of 206. Process 200 subsequently ends. In some embodiments, one or more of steps 204-208 may be performed on various increments of the heat trace system being designed so that the design can be incrementally validated. In many cases, incremental validation rather than validation only at the end of the design process results in a heat trace system design that better meets desired specifications.

Figure 3:
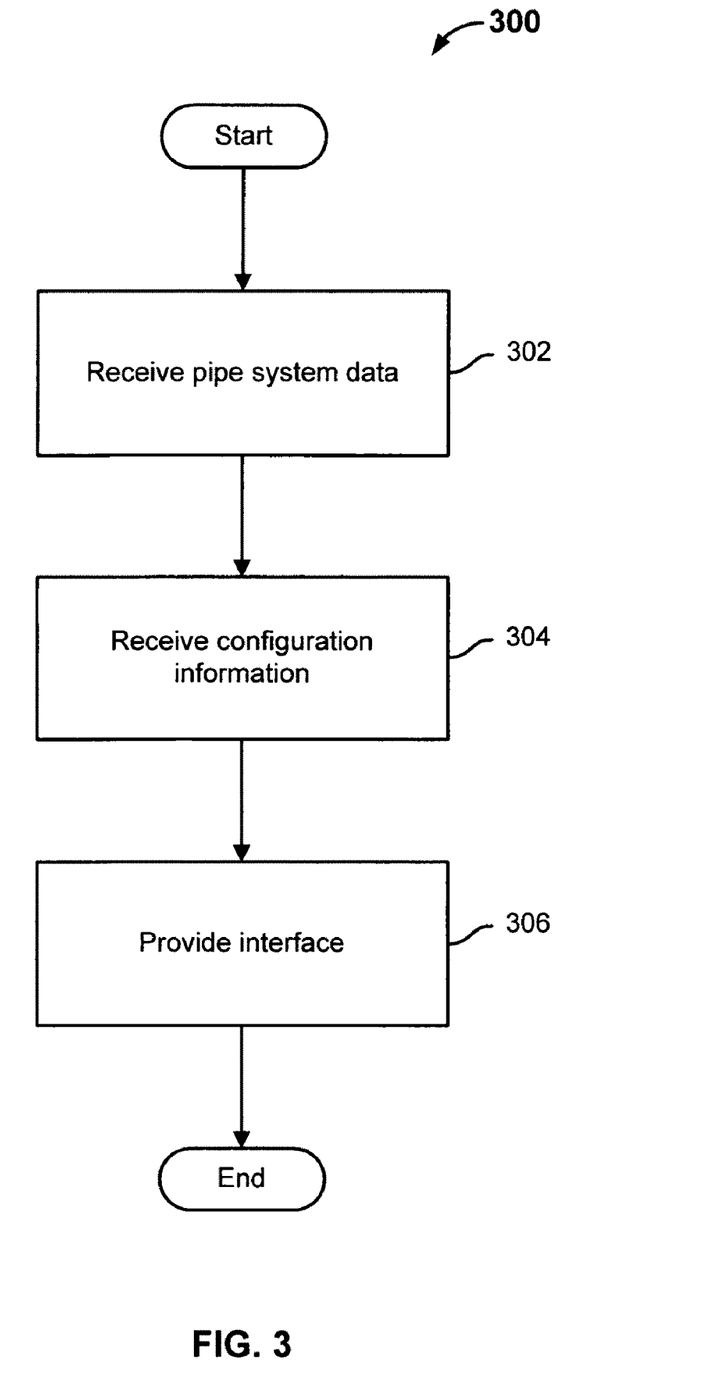
FIG. 3 illustrates an embodiment of a process for configuring a heat trace design system.

FIG. 3 illustrates an embodiment of a process for configuring a heat trace design system. In some embodiments, process 300 is employed at 202 of process 200 of FIG. 2. Process 300 starts at 302 at which data associated with a pipe system that is at least in part desired to be heat traced is received. The pipe system data received at 302 includes pipe system design files such as three-dimensional model data, e.g., in IDF and PCF files; process data, such as the types of materials to be carried by the various pipes in the pipe system and/or the desired temperatures and/or temperature ranges of the materials and/or at which the pipes are desired to be maintained; etc. At 304, configuration information is received. The configuration information received at 304 is employed, for example, to configure or set-up the heat trace design system for a particular pipe system to be heat traced. The configuration information received at 304 may include specifications of various design parameters. For example, the configuration information of 304 may include translations of one or more pipe system component identifiers included in the pipe system data received at 302 to corresponding identifiers that are recognized and used by the heat trace design system; specifications of one or more work breakdown structure elements of the pipe system; heat trace system component preferences such as the types and/or models of components to be used in the heat trace system and/or allowed in the bill of materials of the heat trace system; identifiers to be used for heat trace system components; units to be used for the pipe system and/or the heat trace system; current and/or voltage values to be used; area classification information, e.g., whether the pipe system is to be deployed in a hazardous environment; etc. At 306, an interface for selecting and/or specifying pipe segments associated with heat trace circuits of the pipe system is provided, and process 300 ends. In some embodiments, the interface provided at 306 includes a three-dimensional representation of at least a portion of the pipe system rendered using the pipe system data received at 302. Such a three-dimensional representation or model provides, for example, an intuitive view of the size and geometry of the pipe system and can be used by a user of the heat trace design system to select one or more segments of the pipe system to be heat traced. In some embodiments, the interface provided at 306 includes options to show and/or create pipe segment hierarchies for heat trace circuits of the pipe system.

A user may create or specify one or more pipe segments of various types for each heat trace circuit, for example, using the interface provided at 306 of process 300 of FIG. 3. A pipe segment is empty until populated with pipe system data such as using process 400 of FIG. 4. As described with respect to process 400, in some embodiments, a pipe segment can be at least in part automatically populated, e.g., with pipe system data needed for heat trace system design. In some embodiments, a selection of a pipe system location or component by a user with respect to a selected pipe segment results in the pipe segment to at least in part be automatically populated with data associated with the portion of the pipe system between the nearest boundary conditions on either side of the selected location or component.

Figure 4:
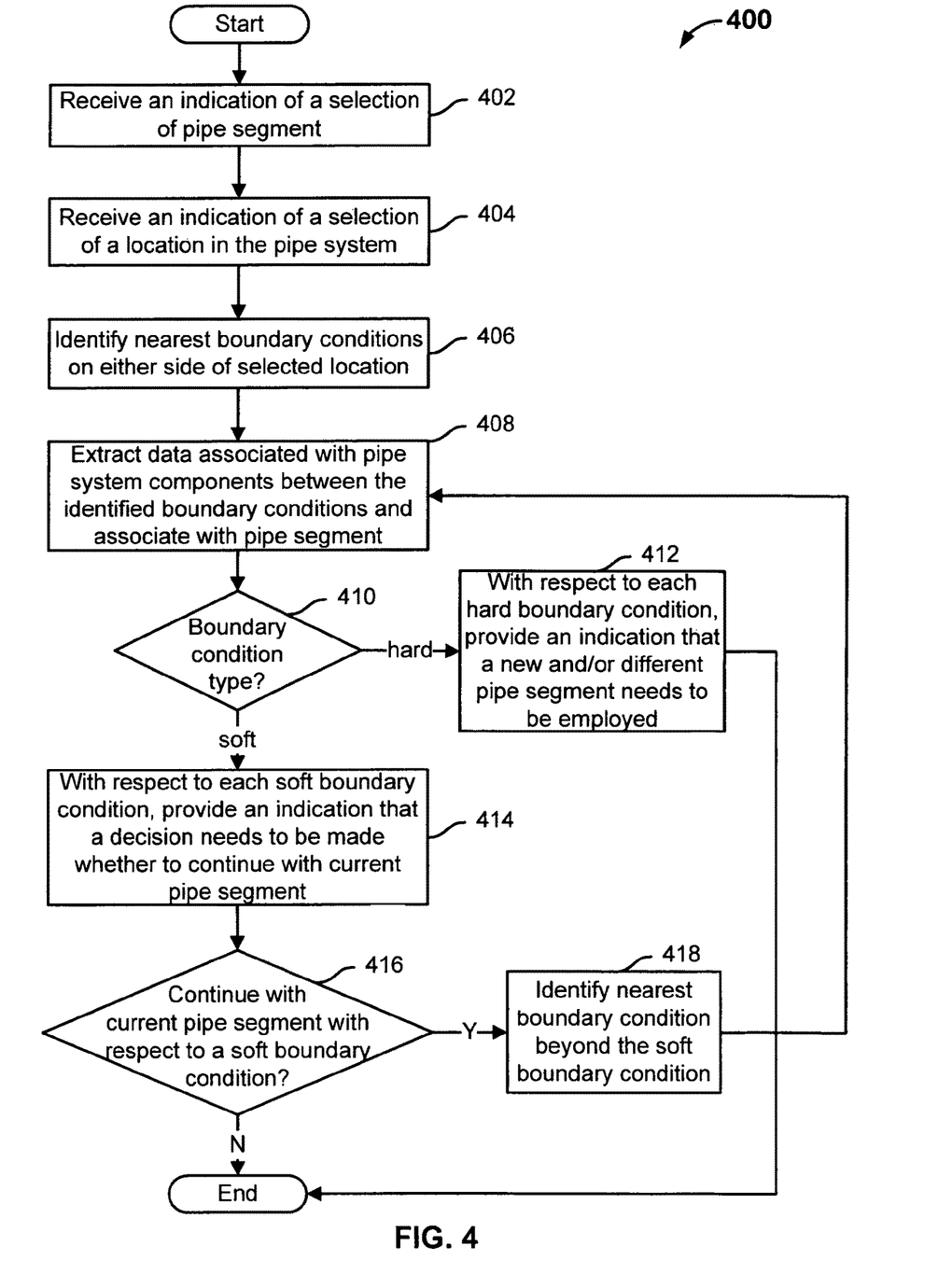
FIG. 4 illustrates an embodiment of a process for receiving a specification of a pipe segment.

FIG. 4 illustrates an embodiment of a process for receiving a specification of a pipe segment. In some embodiments, process 400 is employed at 204 of process 200 of FIG. 2. Process 400 starts at 402 at which an indication of a selection of a pipe segment is received. For example, the indication of 402 may be received in response to a user selecting or clicking on the pipe segment as the current pipe segment, for example, via the interface provided at 306 of process 300 of FIG. 3. In some embodiments, 402 includes receiving an indication of a creation of the pipe segment, for example, within a hierarchy of pipe segments associated with a particular heat trace circuit. At 404, an indication of a selection of a location in the pipe system is received. For example, the indication of 404 may be received in response to the user selecting or clicking on the location in a three-dimensional model of the pipe system provided to the user, for example, via the interface provided at 306 of process 300 of FIG. 3. In some embodiments, the selected location is associated with a particular pipe system component. At 406, the nearest boundary conditions on either side of the selected location are automatically identified. A boundary condition, as described further below, comprises a pipe system characteristic that may affect heat loss properties and/or heater selection criteria. At 408 data and/or design parameters related to one or more pipe system components between the identified boundary conditions are automatically extracted from data available for the pipe system (e.g., from the data/configuration information received at 302 and 304 of process 300 of FIG. 3) and associated with the selected pipe segment. In some embodiments, the pipe system components automatically associated with the pipe segment at 408 comprise the maximum amount of the pipe system along either side of the selected location and contiguous to the selected location that can be automatically determined to share one or more heat loss characteristics and/or heater selection criteria. The automatic extraction of the pipe system components between the identified boundary conditions as well as associated design parameters and/or properties from available pipe system data and/or configuration information eliminates the need for a user to manually determine and specify such information, reducing the likelihood of error as well as the design time. In some embodiments, 408 includes highlighting in the three-dimensional model of the pipe system the pipe system components between the boundary conditions that are automatically associated with the selected pipe segment so that the user can easily discern which pipe system components have been associated with the selected pipe segment.

Figure 5:
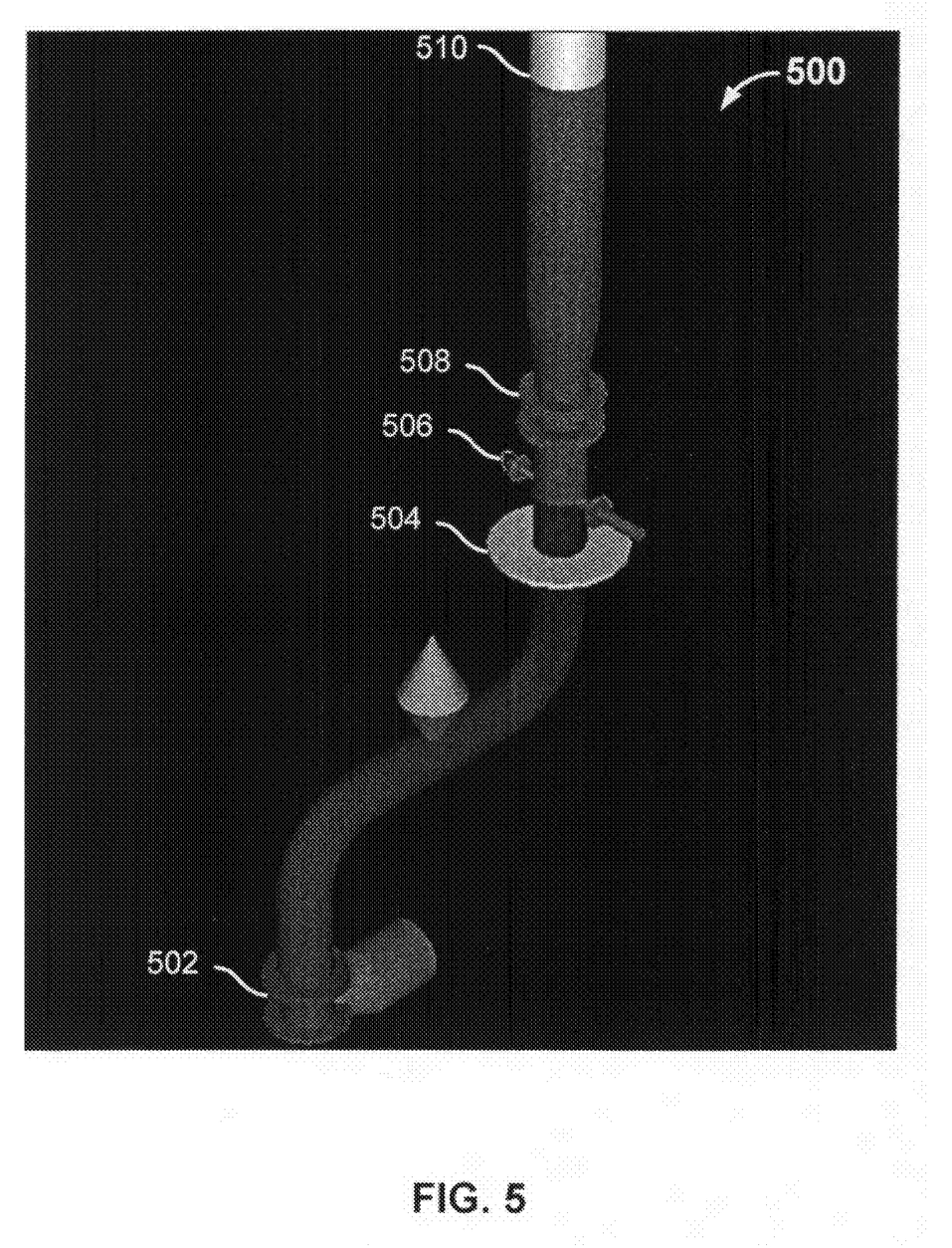
FIG. 5 illustrates examples of some boundary conditions.

In various embodiments, any appropriate boundary conditions and/or classifications of boundary conditions may be defined. In some embodiments, the possible boundary conditions comprise two different types: hard boundary conditions and soft boundary conditions. A hard boundary condition indicates that pipe system components at and/or beyond the hard boundary condition need to be included in a new or different pipe segment since heat loss characteristics and/or heater selection criteria are likely to change at and/or beyond the hard boundary condition. Examples of hard boundary conditions include changes in pipe bore, changes in pipe material, changes in pipe insulation, the end of a pipeline, etc. In some embodiments, a pipe system component may be allowed to be covered by only a single heat trace circuit. In such cases, a pipe system component covered by another heat trace circuit comprises a hard boundary condition. Alternatively, in some embodiments, a pipe system component may be covered by a plurality of heat trace circuits, for example, for redundancy or to more quickly heat the component. In such cases, a pipe system component covered by another heat trace circuit comprises a soft boundary condition. A soft boundary condition indicates that a decision needs to be made (e.g., by the user) whether to include pipe system components at and/or beyond the soft boundary condition in the current pipe segment or in a new or different pipe segment. In some embodiments, a new or different pipe segment needs to be selected for pipe system components at and/or beyond a soft boundary condition if heat loss properties and/or heater selection criteria of the pipe system are at least expected to change. Examples of soft boundary conditions include wall and/or floor penetrations in the pipe system, tees in the pipe system, a change in work breakdown structure elements, a start of a new or different model file, a start of a new or different line designation, etc. A wall and/or floor penetration is a soft boundary condition, for instance, because environmental conditions (such as ambient temperature, wind speed, etc.) on either side of the wall or floor may be the same (in which case the same pipe segment may be employed) or may be different (in which case a new or different pipe segment needs to be selected since environmental conditions affect heat loss). In some embodiments, the pipe system data, e.g., received at 302 of process 300 of FIG. 3, associated with one or more pipe system components may include an indicator or flag that specifies whether the corresponding pipe system component is to be heat traced. For example, a flag with value "1" may indicate that an associated pipe system component is to be heat traced, and a flag with value "0" may indicate that an associated pipe system component is not to be heat traced. In some embodiments, a tracing indicator change (i.e. a flag value change) comprises a soft boundary condition. A decision is requested by a user, for example, in case one or more tracing indicators have been incorrectly specified in the original pipe system data. FIG. 5 illustrates examples of some boundary conditions. A three-dimensional portion of a pipe system 500 is depicted. The given example illustrates the end of a pipeline 502, a floor penetration 504, a tee 506, a pipe bore change 508, and a tracing indicator change 510 which in some cases is represented by a change in color of the pipe.

Returning to process 400 of FIG. 4, the type of each identified boundary condition is determined at 410. If it is determined at 410 that one or more hard boundary conditions were identified, an indication is provided at 412 with respect to each identified hard boundary condition that a new and/or different pipe segment needs to be employed for pipe system components at and/or beyond the hard boundary condition, and process 400 ends. If it is determined at 410 that one or more soft boundary conditions were identified, an indication is provided at 414 with respect to each identified soft boundary condition that a decision needs to made whether to continue with the current pipe segment or to create a new or use a different pipe segment for pipe system components at and/or beyond the soft boundary condition. At 416 it is determined whether an indication to continue with the current pipe segment (i.e. the pipe segment selected at 402) is received with respect to a soft boundary condition. If an indication to continue with the current pipe segment is received with respect to a soft boundary condition at 416, at 418 a nearest boundary condition beyond the soft boundary is identified, and process 400 continues at step 408. If an indication to continue with the current pipe segment is not received with respect to a soft boundary condition at 416, process 400 ends. In various embodiments, a new and/or different pipe segment selected for pipe system components at and/or beyond a boundary condition may be a part of the same heat trace circuit as the pipe segment selected at 402 or of a different heat trace circuit.

In some embodiments, using process 400, much of the data needed for heat loss calculations and/or heat trace system component selection is automatically extracted from available pipe system data and used to populate pipe segments. In addition to accelerating the design process, the automatic rather than manual extraction of such data eliminates or at least reduces the likelihood of errors. In some embodiments, user input is only required at boundary conditions. In such cases, the boundary conditions give the user opportunities to make design decisions. For example, a user may select to continue populating a current pipe segment (e.g., beyond a soft boundary condition if the heat loss properties and/or heater selection criteria are determined not to change beyond the soft boundary condition), a user may select and/or specify a new and/or different pipe segment if heat loss properties and/or heater selection criteria are expected to change beyond a boundary condition, a user may decide to continue with a pipe segment of a different heat trace circuit beyond a boundary condition and/or not to heat trace the pipe system beyond a boundary condition, etc. In some embodiments, decisions at one or more boundary conditions may at least in part be automated based on the possible choices that can be made at the boundary conditions, and user input may not be required and/or may be optional.

Figure 6:
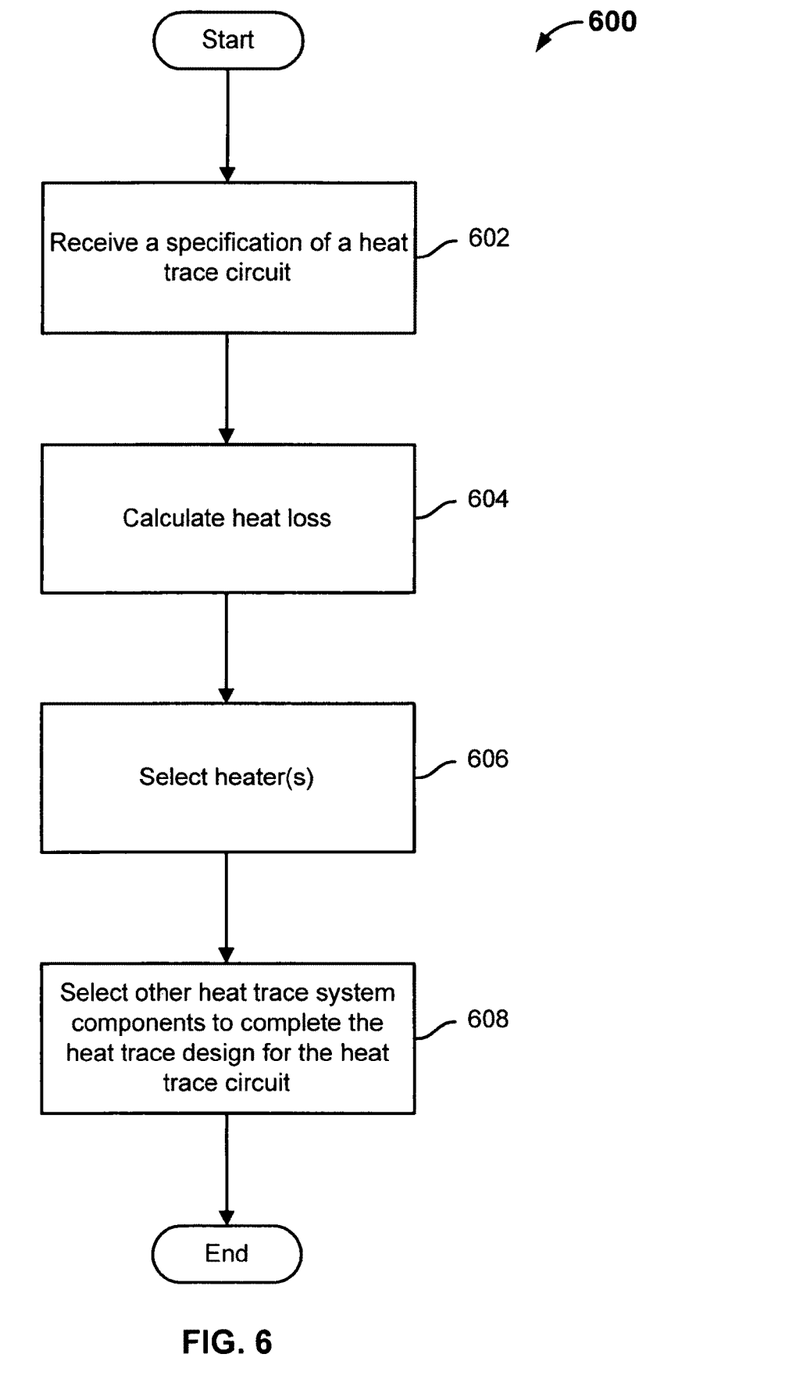
FIG. 6 illustrates an embodiment of a process for designing at least a portion of a heat trace system.

FIG. 6 illustrates an embodiment of a process for designing at least a portion of a heat trace system. In some embodiments, process 600 is employed at 206 of process 200 of FIG. 2. Process 600 starts at 602 at which a specification of a heat trace circuit (or part thereof) is received. In some embodiments, the specification of the heat trace circuit comprises specifications of one or more pipe segments that comprise the heat trace circuit. At 604, heat loss is calculated for various parts of the heat trace circuit. For example, data associated with a pipe segment is employed to calculate the heat loss of the pipe segment and/or one or more pipe system components included in the pipe segment. At 606, one or more heaters are selected for the heat trace circuit based at least in part on the heat loss calculations of 604. For example, heaters that best meet specified heating specifications and/or heat trace system preferences are selected. In some embodiments, 606 includes determining the number of passes (i.e. the trace ratio) of the heaters for various pipe system components. At 608, other heat trace system components such as connecting components are selected to complete the heat trace design for the heat trace circuit. Process 600 subsequently ends. In some embodiments, process 600 results in the generation of a bill of materials for the portion of the heat trace system being designed. The selections at 606 and 608 may be based on specified design constraints and/or preferences. For example, the selections of 606 and 608 may be made to ensure that at least hard constraints are satisfied. Soft constraints may be attempted to be satisfied to the extent possible, and in case one or more is not satisfied, appropriate warnings (e.g., cable too long, amperage too high, temperature exceeds range, etc.) may be provided. Although described for a single heat trace circuit or part thereof, process 600 can be similarly employed for a plurality of heat trace circuits or parts thereof whose specifications are received at 602.

Figure 7:
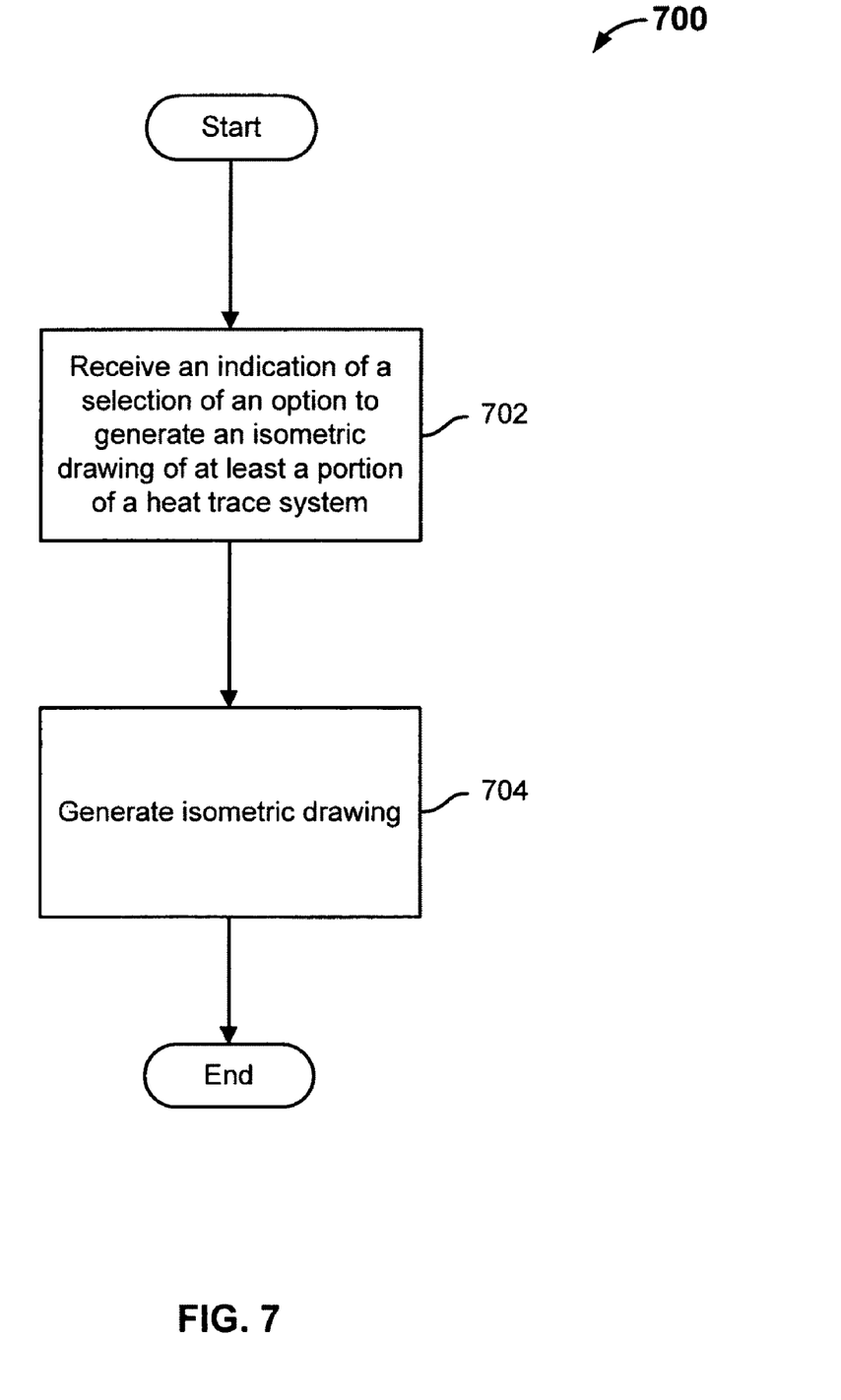
FIG. 7 illustrates an embodiment of a process for generating a heat trace isometric drawing that depicts the routing of at least a portion of the heat trace system.

FIG. 7 illustrates an embodiment of a process for generating a heat trace isometric drawing that depicts the routing of at least a portion of the heat trace system. In some embodiments, process 700 is employed at 208 of process 200 of FIG. 2. Process 700 starts at 702 at which an indication of a selection of an option to generate an isometric drawing for at least a portion of a heat trace system is received. For example, the indication of 702 may be received with respect to a particular heat trace circuit of a heat trace system. At 704, an isometric drawing is generated, and process 700 ends. In some embodiments, the drawing generated at 704 may include border information such as calculated heat trace data, the bill of materials of the heat trace system or at least of the portion of the heat trace system depicted in the drawing, temperature data, pipe system source files, etc. In some embodiments, the drawing generated at 704 may not be isometric. In some embodiments, multiple drawings may be generated at 704.

Figure 8:
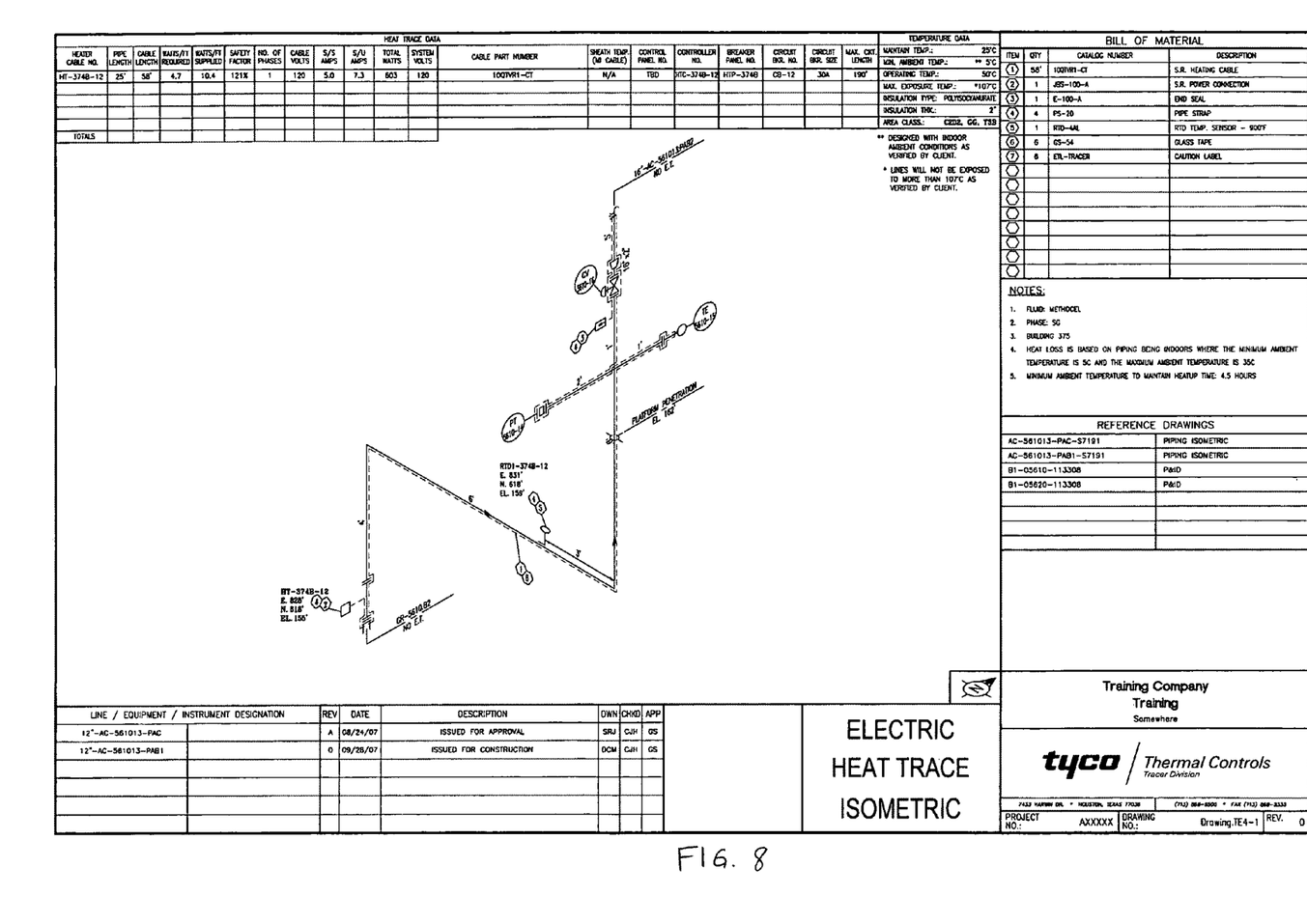
FIG. 8 illustrates an embodiment of a heat trace isometric drawing.

FIG. 8 illustrates an embodiment of a heat trace isometric drawing. In some embodiments, the drawing of FIG. 8 is generated at 704 of process 700 of FIG. 7. As depicted, the isometric drawing includes a variety of border information.

As previously described, in some embodiments, a single instance of pipe and heat trace design data is maintained and/or employed by all modules of a heat trace design system. This not only ensures that consistent data is used for calculating heat loss and selecting heat trace system components, generating isometric drawings of the heat trace system, and populating the border information on the isometric drawings but also ensures that changes in the source data cascade through the system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for determining at least a portion of a heat trace system for at least a portion of a pipe system, comprising:
   receiving pipe system data, wherein the pipe system data includes data associated with pipe system components;
   receiving a selection of a pipe system component;
   automatically extracting data associated with the selected pipe system component and a set of one or more pipe system components in a vicinity of the selected pipe system component that share one or more heat loss characteristics and/or heater selection criteria with the selected pipe system component from the received pipe system data, wherein the automatically extracted data relates to heat trace system component selection; and
   determining one or more heat trace system components for the set of pipe system components based at least in part on the extracted data.

2. The method as recited in claim 1, further comprising receiving configuration information.

3. The method as recited in claim 1, further comprising providing an interface that includes a three dimensional model of the pipe system generated using the received pipe system data.

4. The method as recited in claim 1, further comprising identifying nearest boundary conditions on either side of the selected pipe system component.

5. The method as recited in claim 4, wherein the boundary conditions comprise one or more of a pipe bore change, a pipe material change, an insulation change, an end of a pipeline, an already traced pipe system component, a wall penetration, a floor penetration, a tee, a work breakdown structure element change, a tracing indicator change, a start of a new or different model file, and a start of a new or different line designation.

6. The method as recited in claim 4, wherein the set of pipe system components comprises contiguous pipe system components on either side of the selected pipe system component and between the nearest boundary conditions.

7. The method as recited in claim 1, wherein the set of pipe system components includes one or more pipe system components beyond one or more boundary conditions.

8. The method as recited in claim 1, wherein pipe system components included in the set share one or more heat loss properties and/or heater selection criteria.

9. The method as recited in claim 1, wherein the heat trace system of the pipe system includes one or more heat trace circuits.

10. The method as recited in claim 9, wherein each heat trace circuit is specified by one or more pipe segments and wherein each pipe segment comprises a container which when populated includes data associated with one or more contiguous pipe system components that share one or more heat loss properties and/or heater selection criteria.

11. The method as recited in claim 10, wherein a routing of a heat trace circuit is based at least in part on a hierarchical arrangement of one or more associated pipe segments.

12. The method as recited in claim 1, further comprising populating a pipe segment associated with a heat trace circuit with the automatically extracted data.

13. The method as recited in claim 1, wherein determining one or more heat trace system components for the set of pipe system components based at least in part on the extracted data comprises performing heat loss calculations.

14. The method as recited in claim 1, wherein the automatically extracted data is at least in part employed in performing heat loss calculations.

15. The method as recited in claim 1, further comprising generating a heat trace isometric drawing based at least in part on one or more of the received pipe system data, the automatically extracted data, heat trace design data including the determined heat trace system components, and configuration information.

16. The method as recited in claim 1, wherein a same set of one or more of the received pipe system data, configuration information, the automatically extracted data, and heat trace design data including the determined heat trace system components is employed to determine the heat trace system components, generate a heat trace drawing, and populate the heat trace drawing with border information.

17. The method as recited in claim 1, wherein pipe system components comprise one or more of a pipe, a flange, a valve, a support, and an instrument.

18. The method as recited in claim 1, wherein heat trace system components comprise one or more of a heating cable, a power connection box, a splice box, a tee box, an end seal, an attachment device, a thermostat, and a controller.

19. The method as recited in claim 1, wherein receiving a selection of a pipe system component comprises receiving a selection of a pipe system location.

20. A system for determining at least a portion of a heat trace system for at least a portion of a pipe system, comprising:
 a processor configured to:
  receive pipe system data, wherein the pipe system data includes data associated with pipe system components;
  receive a selection of a pipe system component;
  automatically extract data associated with the selected pipe system component a set of one or more pipe system components in a vicinity of the selected pipe system component that share one or more heat loss characteristics and/or heater selection criteria with the selected pipe system component from the received pipe system data, wherein the automatically extracted data relates to heat trace system component selection; and
  determine one or more heat trace system components for the set of pipe system components based at least in part on the extracted data; and a memory coupled to the processor and configured to provide instructions to the processor.

21. A computer program product for determining at least a portion of a heat trace system for at least a portion of a pipe system, the computer program product being embodied in a computer readable medium and comprising computer instructions for:
 receiving pipe system data, wherein the pipe system data includes data associated with pipe system components;
 receiving a selection of a pipe system component;
 automatically extracting data associated with the selected pipe system component and a set of one or more pipe system components in a vicinity of the selected pipe system component that share one or more heat loss characteristics and/or heater selection criteria with the selected pipe system from the received pipe system data, wherein the automatically extracted data relates to heat trace system component selection; and
 determining one or more heat trace system components for the set of pipe system components based at least in part on the extracted data.

22. The computer program product as recited in claim 21, the computer program product further comprising computer instructions for identifying nearest boundary conditions on either side of the selected pipe system component.

23. The computer program product as recited in claim 22, wherein the set of pipe system components comprises contiguous pipe system components on either side of the selected pipe system component and between the nearest boundary conditions.

24. The computer program product as recited in claim 21, wherein pipe system components included in the set share one or more heat loss properties and/or heater selection criteria.

25. The computer program product as recited in claim 21, wherein a same set of one or more of the received pipe system data, configuration information, the automatically extracted data, and heat trace design data including the determined heat trace system components is employed to determine the heat trace system components, generate a heat trace drawing, and populate the heat trace drawing with border information.

* * * * *